United States Patent [19]

Atmur et al.

[11] Patent Number: 5,794,943

[45] Date of Patent: Aug. 18, 1998

[54] PISTON RINGS PARTICULARLY SUITED FOR USE WITH CERAMIC MATRIX COMPOSITE PISTONS AND CYLINDERS

[75] Inventors: Steven Donald Atmur, Riverside; Thomas Edward Strasser, Corona, both of Calif.

[73] Assignee: Northrop Grumman Corporation, Los Angeles, Calif.

[21] Appl. No.: 820,932

[22] Filed: Mar. 19, 1997

Related U.S. Application Data

[62] Division of Ser. No. 515,924, Aug. 16, 1995, Pat. No. 5,660,399.

[51] Int. Cl.[6] .................................................. F16J 9/28
[52] U.S. Cl. .......................... 277/441; 277/442; 92/170.1
[58] Field of Search ................................. 277/227, 438, 277/440, 441, 442, 443; 92/170.1

[56] References Cited

U.S. PATENT DOCUMENTS

| 3,814,447 | 6/1974 | Prasse et al. | 277/224 |
| 5,063,881 | 11/1991 | Kawamura | 123/1 A |
| 5,154,433 | 10/1992 | Naruse | 277/224 |

Primary Examiner—Daniel G. DePumpo
Attorney, Agent, or Firm—Terry J. Anderson; Karl J. Hoch, Jr.

[57] ABSTRACT

A piston ring for use with ceramic matrix composite engine cylinders. In one embodiment, an extra-hard material is used for a conventional ring design. In another embodiment, a hardened edge employing Tungsten Carbide Cobalt is employed. The same edge treatment can also be employed for other seals such as that of a rotary engine.

26 Claims, 2 Drawing Sheets

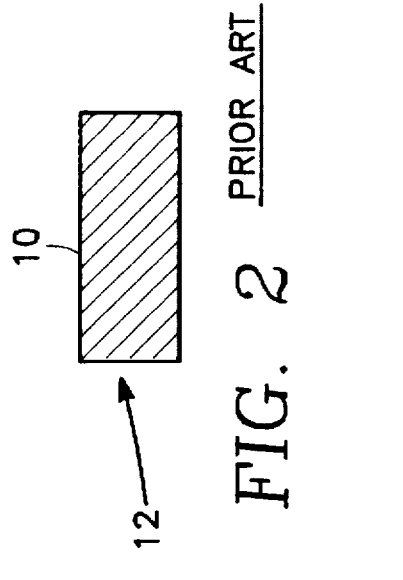
FIG. 1
FIG. 2 PRIOR ART
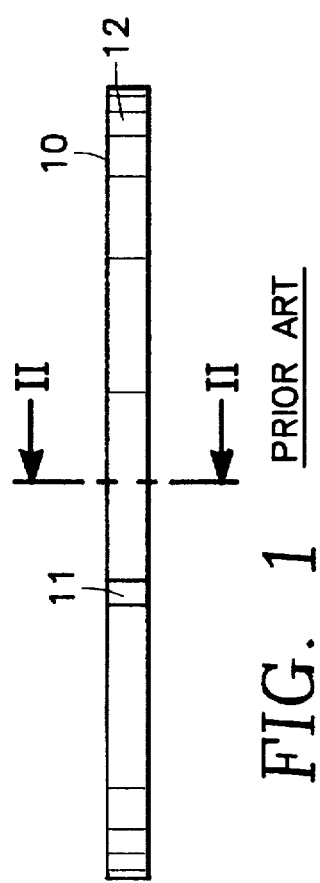
FIG. 3
FIG. 4
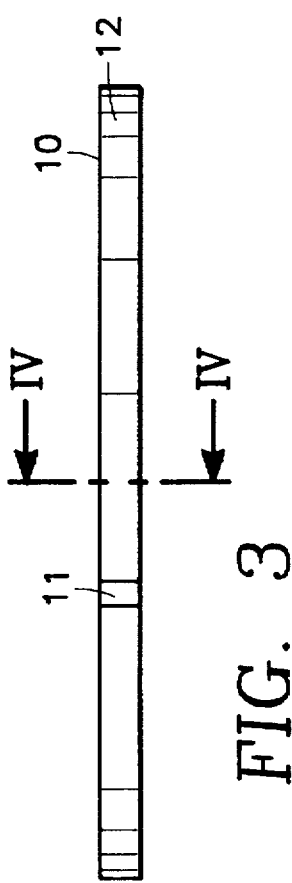
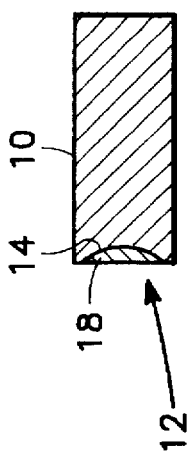
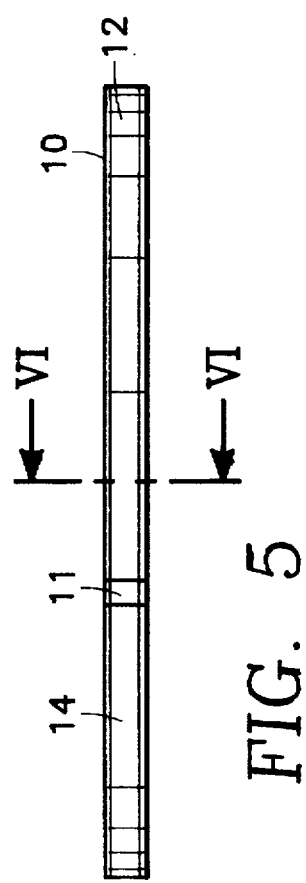
FIG. 5
FIG. 6

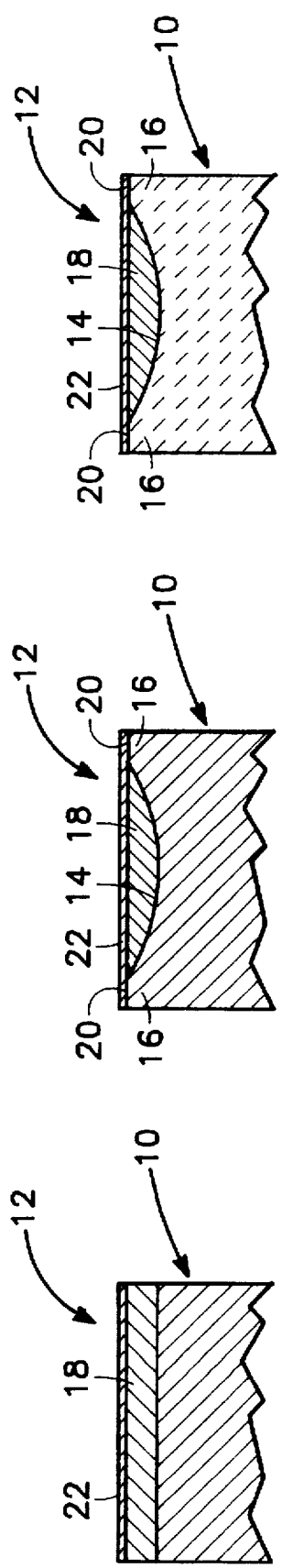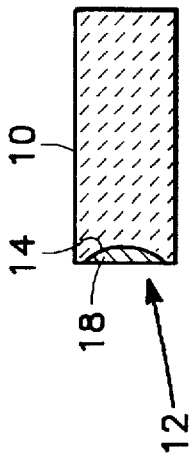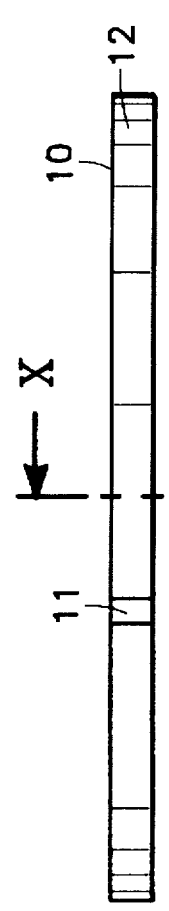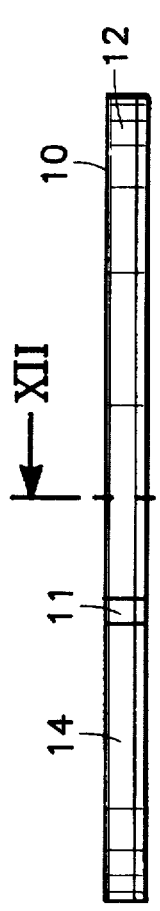

PISTON RINGS PARTICULARLY SUITED FOR USE WITH CERAMIC MATRIX COMPOSITE PISTONS AND CYLINDERS

This is a division, of application Ser. No. 08/515,924, filed Aug. 16, 1995 now Pat. No. 5,660,339.

BACKGROUND OF THE INVENTION

1. Technical Field

This invention relates to piston rings for use with pistons of an internal combustion engine and, more particularly, to a seal for a first ceramic matrix composite part in sliding contact with a second part, also made of a ceramic matrix composite material. The seal being commonly known as a piston ring being comprised of an elongated member having an outer contacting edge for contacting the ceramic matrix composite material in sliding contact, the edge of the sealing member having a longitudinal groove formed therein; and, a quantity of an erosion-resistant material tribologically matched to the ceramic contacting surface, such as Tungsten Carbide Cobalt, disposed throughout the length of the groove. The ring can be made as described or coated with a thin, 50 to 500 Angstroms, coating of Titanium Nitride or other similar material to further reduce wear and increase engine performance by reducing the relative friction between the piston ring edge surface and the ceramic matrix composite structure.

2. Background Art

In the basic operation of an internal combustion engine, a piston moving up and down within a cylinder draws in a combustible mixture of fuel and air on its down-stroke and compresses it on its up-stroke. The compressed mixture is then ignited and burns to create energy within the cylinder, which energy is transferred to the piston as power. If the piston is not properly sealed to the cylinder, blow-by occurs and the compression of the mixture is reduced or non-existent thereby reducing or eliminating the effectiveness of that piston/cylinder within the engine. The foregoing description is, of course, quite general and two-cycle, four-cycle, diesel, and rotary engines vary slightly in their mechanics. The basic fact is that the entity creating the compressed volume within an area must have an adequate seal to prevent blow-by or efficiency is lost to some degree. While the principles of the present invention are applicable to a wide variety of engine types employing the special materials to be described, a standard cylindrical piston moving up and down within a cylindrical cylinder of an engine block having one or more cylinders will be used as the embodiment chosen for description hereinafter and in the drawings which accompany it. It should be understood, however, that it is intended the invention described and claimed herein be accorded a breadth in keeping with the scope and spirit of the disclosure as applied to all engine types of applicability.

In a classic prior art engine, the cylinders and pistons are of metal. Early engines were of cast iron while later engines are of lighter metals and alloys of, for example, aluminum. Also, the use of cylindrical sleeve inserts for the walls of the cylinders has become popular. Regardless of the materials used for the cylinder walls, the standard method of sealing the space between the cylinder walls and the pistons is the piston ring. A space exists (and must exist) because of dissimilar thermal expansion of the metal components. If the piston and cylinder were sized exactly with only enough clearance for the piston to fit within the cylinder with a coating of lubricating oil film between them, as soon as the metal heated from the combustion within the cylinders and expanded, the piston would seize within the cylinder. If enough clearance was provided initially to allow for expansion, the blow-by would be so extreme that the engine would not run sufficiently to get up to temperature and create the proper seal. Thus, the expansion space is provided and the clearance gap is closed with piston rings as shown in FIGS. 1 and 2. There may be one ring 10, two rings 10, or more, depending on the engine design and the objectives thereof. Regardless of the number, each piston ring 10 is disposed in a ring groove in the peripheral surface of the piston adjacent the top thereof. The ring 10 is not a complete circle. Rather, it is incomplete and has a gap 11 at its ends so that it can be compressed in diameter. The ring groove in the piston is made deep enough that the ring 10 can move in and out as the piston expands and contracts.

Early low compression engines with piston rings made of the materials available at the time tended to form carbon within the ring grooves over time. Also, one had to take great care in breaking-in the engine when new to allow the piston rings to properly "seat" to the cylinder walls. As a result, it was not uncommon to have to do a ring job, i.e. replace the piston rings with new ones, at mileages as low as 50,000 miles. Recent engine designs and the materials employed for the pistons, cylinders, and rings as well as the modern more accurately computer-controlled engines which have less tendency to form carbon in the ring grooves have pushed the life expectancy to the point that the average automobile owner never has to even think about a ring job within the useful life of his/her automobile.

While engine designs and materials have certainly improved over the years, there still remain deficiencies such as lower than desirable fuel efficiency and higher than desirable pollution emissions. In a co-pending application entitled HIGH-EFFICIENCY, LOW-POLLUTION ENGINE, Ser. No. 08/515,604 U.S. Pat. No. 5,638,779, by the inventors herein filed on Aug. 16, 1995 and assigned to the common assignee of this application, an improved structural fiber reinforced ceramic matrix composite (FRCMC) material is disclosed having high breakage resistance and particular applicability to use for parts in a high temperature internal combustion engine, the teachings of which are incorporated herein by reference. Being of the FRCMC material, the pistons and cylinders can withstand much higher operating temperatures than conventional internal combustion engines. Moreover, since the coefficient of thermal expansion of the parts is much lower, much closer tolerances can be maintained without the danger of engine seizure. Still, however, to operate at as high a compression ratio as possible without efficiency-robbing blow-by, there must be piston rings. Conventional piston rings are not adequate, however. Despite the many improvements in materials and wear resistance, prior art piston rings are intended for use in metal engines. The FRCMC material, in conjunction with its ceramic wear coatings will quickly erode even the hardest conventional metallic piston rings.

Wherefore, it is an object of the present invention to provide a piston ring that can be used in a ceramic cylinder with a ceramic piston without rapid erosion.

It is another object of the present invention to provide a piston ring that can be used in a FRCMC cylinder in combination with a FRCMC piston without rapid erosion.

It is still another object of the present invention to provide a piston/rotor seal that can be used in an internal combustion engine of any type without rapid erosion.

Other objects and benefits of this invention will become apparent from the description which follows hereinafter when read in conjunction with the drawing figures which accompany it.

SUMMARY OF THE DISCLOSURE

In one embodiment, the foregoing objects have been attained by the piston ring for a piston of an engine having a cylinder of a ceramic matrix composite material of the present invention comprising an incomplete circular ring, the ring having an outer peripheral edge for contacting the ceramic material in sliding contact, the edge having a longitudinal groove formed therein; and, a quantity of an erosion-resistant material disposed throughout the length of the groove.

In another embodiment of the invention, the longitudinal groove in the edge of the piston ring is not included and the erosion-resistant material is disposed directly on the flat surface of the contacting surface of the piston ring.

The preferred erosion-resistant material is Tungsten Carbide Cobalt. Additionally in the preferred embodiment, sliding friction is further reduced by applying a thin coating of Titanium Nitride over the Tungsten Carbide Cobalt.

Also preferably, the thickness of the erosion resistant coating is between 5 and 25 thousandths of an inch in depth and the erosion-resistant material is coated with between 50 and 500 Angstroms of the Titanium Nitride.

BRIEF DESCRIPTION OF THE DRAWINGS

FIG. 1 is a simplified side view of a prior art metal piston ring.

FIG. 2 is a cutaway view through one side of the piston ring of FIG. 1.

FIG. 3 is a simplified side view of a metal piston ring according to the present invention.

FIG. 4 is a cutaway view through one side of the piston ring of FIG. 3 in an embodiment having the erosion-resistant material in place after application thereof to the contacting edge of the piston ring and prior to seating.

FIG. 5 is a simplified side view of a metal piston ring according to the present invention including a longitudinal groove in the contacting surface.

FIG. 6 is a cutaway view through one side of the piston ring of FIG. 5 in an embodiment having the erosion-resistant material in place after application thereof to the longitudinal groove and after seating.

FIG. 7 is a greatly enlarged cutaway drawing of the contacting edge of a piston ring or seal according to the present invention without a groove after the plasma spray application of the erosion-resistant material thereto and prior to seating thereof. An optional friction-reducing coating is also depicted.

FIG. 8A is a greatly enlarged cutaway drawing of the contacting edge of a piston ring or seal according to the present invention with a groove after the plasma spray application of the erosion-resistant material thereto and the "seating" thereof. An optional friction-reducing coating is also depicted.

FIG. 8B illustrates the piston ring of FIG. 8A made of another material.

FIG. 9 is a simplified side view of a non-metal piston ring according to the present invention.

FIG. 10 is a greatly enlarged cutaway drawing of one side of a ceramic piston ring or seal according to the present invention in an embodiment having no additional coating on the contacting edge.

FIG. 11 is a simplified side view of a non-metal piston ring according to the present invention including a groove.

FIG. 12 is a greatly enlarged cutaway drawing of one side of a ceramic piston ring or seal according to the present invention in an embodiment having a longitudinal groove containing an additional coating on the contacting edge.

DETAILED DESCRIPTION OF THE PREFERRED EMBODIMENTS

The piston ring of the present invention can be made of metal or of non-metal. As a reminder, while a piston ring is being described for purposes of an example of this disclosure, the present invention would also be applicable to make the rotor seals of, for example, a FRCMC rotary engine. In either case, it will be recognized and understood by those of ordinary skill in the art that it is the sealing edge that moves in sealed contact with a ceramic material that is the critical point.

Referring to FIGS. 3–8 along with FIGS. 9–12, the piston ring 10 may be made of metal material, as shown in FIG. 8A, such as an alloy of standard piston ring material to which a quantity of Tungsten Carbide Cobalt (TCC) has been added for additional hardness. Due to the higher operating temperatures of the ceramic-lined engine, it may be desirable to employ Stelite alloys, high temperature tool steel alloys, iconel, or the like, as the basic alloy so as to extend the life of the piston ring during use in higher operating temperature engines.

Referring to FIGS. 9–12 along with FIGS. 3–8, the piston ring may be made of a non-metal material, as shown in FIG. 8B, such as a monolithic ceramic material, including the ceramic material ZBC. The monolithic ceramic ring does not absolutely require the TCC coating or the Titanium Nitride coating which are described hereinafter; but, as will be seen, they can be added for additional benefits.

While it may be possible to use either of the two above-described materials for a successful piston ring in a ceramic-lined engine under some operating conditions and, accordingly, it is intended that the same be included within the scope of claim coverage of this application, it is preferred that the edge treatment shown in detail in FIG. 8 be added. The contacting edge 12 has a C-shaped cross section groove 14 formed longitudinally therein along the length thereof leaving "ears" 16 of the ring material peripherally on both sides thereof. Different shaped grooves could, of course, be employed if desired. The groove 14 is about 5 to 25 thousandths of an inch in depth and is used to retain an erosion-resistant coating 18 of Tungsten Carbide Cobalt (TCC) that is plasma-sprayed into the groove 14 to a substantially constant thickness using conventional techniques well known to those of ordinary skill in the art. For some applications, particularly small lawn and garden type engines of low horsepower and compression, the groove 14 can probably be eliminated as depicted in FIG. 7. When the engine is operated at very high combustion pressures and the TCC is sprayed directly on a flat outer contacting surface as in FIG. 7, however, it tends to break and flake off with time, thereby subjecting the ring 10 to excessive wear. The grooved method of FIG. 8 prevents the peeling forces at the edges of the TCC coating and eliminates the flaking off problem even under extreme pressures and high speeds.

As depicted in FIG. 6 and best seen in FIG. 8, the TCC coating 18 is preferably applied into the groove 14 so as to be contained between the tips 20 of the ears 16. In normal use, the tips 20, therefore, "seat" in the manner of prior art metal piston rings, thereby forming an optimum seal with the surrounding sidewalls of the cylinder. That is, the tiny surface irregularities of the ceramic sleeve material forming the sidewalls are able to grind away minute quantities of the ring material in the ears 16 so that the tips 20 conform virtually exactly to the surface of the sidewalls.

The ring can be made in any of the ways as described above and, if desired and as depicted in FIGS. 7 and 8, further coated with a thin, 50 to 500 Angstroms, coating 22 of Titanium Nitride or other similar material to further reduce wear and increase engine performance by reducing the relative friction between the piston ring contacting surface 12 and the ceramic matrix composite structure.

Wherefore, having thus described the present invention, what is claimed is:

1. A sealing system for an engine comprising:
   a cylinder made of a ceramic matrix composite material;
   a piston disposed within said cylinder;
   an incomplete circular piston ring made of a metal alloy and disposed around said piston wherein said ring has an outer peripheral edge spanning a perimeter of said circular ring and a single inner concave longitudinal groove, wherein said outer peripheral edge is in sliding contact with said ceramic matrix material of said cylinder;
   an erosion-resistant material disposed throughout said inner concave groove spanning the perimeter of said ring for imparting hardness to said ring to enable it to withstand erosion from said sliding contact with said ceramic matrix composite material of said cylinder; and
   a friction reducing material disposed on said outer peripheral edge completely overlying said erosion-resistant material.

2. The sealing system of claim 1 wherein:
   said erosion-resistant material is coated with 50 to 500 angstroms thickness of said friction reducing material.

3. The sealing system of claim 1 wherein:
   a) said erosion-resistant material is tungsten carbide cobalt.

4. The sealing system of claim 3 wherein:
   a) said tungsten carbide cobalt spans along said length of said groove with a substantially uniform thickness.

5. The sealing system of claim 1 wherein:
   said outer peripheral edge is defined by said inner concave longitudinal groove and a single pair of symmetrical ears bounding said inner concave groove.

6. The piston ring of claim 5 wherein said ears are made of said ring material and extend above an outer surface of said erosion-resistant material.

7. The sealing system of claim 1 wherein said friction reducing material is titanium nitride.

8. The piston ring of claim 1 wherein said groove is between 5 and 25 mils in depth.

9. The piston ring of claim 1 wherein said erosion-resistant material spans along said perimeter of said groove with a substantially uniform thickness.

10. The piston ring of claim 1 wherein said groove is between 5 and 25 thousandths of an inch in depth.

11. A sealing system for an engine comprising:
   a) a cylinder having a liner made of a fiber reinforced ceramic matrix composite material;
   b) a piston disposed within said cylinder;
   c) an incomplete circular ring made of a metal alloy and disposed around said piston, said ring having an outer peripheral edge in sliding contact with said fiber reinforced ceramic matrix composite material of said cylinder, said edge having a single inner concave longitudinal groove formed therein; and,
   d) a quantity of an erosion-resistant material disposed throughout a length of said groove; and
   e) a quantity of a friction reducing material disposed on said outer peripheral edge and completely overlying said erosion-resistant material and in sliding contact with said cylinder of the ceramic matrix composite material.

12. The sealing system of claim 6 wherein:
   a) said erosion-resistant material is tungsten carbide cobalt.

13. The sealing system of claim 11 wherein:
   a) said groove is between 5 and 25 mils in depth; and,
   b) said erosion-resistant material spans along said length of said groove with a substantially uniform thickness.

14. The sealing system of claim 11 wherein:
   a) said outer peripheral edge has a single pair of symmetrical ears of ring material and are flush with an outer surface of said erosion-resistant material.

15. The sealing system of claim 11 wherein:
   said friction-reducing material is 50 to 500 angstroms thickness of titanium nitride.

16. A sealing system comprising:
   a) a first part made of a ceramic matrix composite material;
   b) an elongated member made of a metal alloy and having a single inner concave longitudinal groove and a contacting edge in sliding contact with said ceramic matrix composite material of said first part along a line transverse to the direction of sliding contact;
   d) a quantity of an erosion-resistant material harder than the ceramic matrix composite material disposed within said inner concave groove for imparting hardness to said elongated member to enable it to withstand erosion from said sliding contact with said ceramic matrix composite material of said first part; and
   e) a quantity of a friction reducing material disposed on said contacting edge and completely overlying said erosion-resistant material and in sliding contact with said cylinder of the ceramic matrix composite material.

17. The sealing system of claim 16 wherein:
   said erosion-resistant material is tungsten carbide cobalt.

18. The sealing system of claim 16 wherein:
   said erosion-resistant material is disposed within a groove along a length of said contacting edge.

19. The sealing system of claim 18 wherein:
   a) said groove is between 5 and 25 mils in depth; and,
   b) said erosion-resistant material spans along said length of said groove with a substantially uniform thickness.

20. The sealing system of claim 16 wherein:
   a) said contacting edge has a single pair of symmetrical ears made of a material identical to said seal material and are flush with an outer surface of said erosion-resistant material.

21. The piston ring of claim 16 wherein said friction reducing material is titanium nitride.

22. The piston ring of claim 18 wherein said groove is between 5 and 25 mils in depth.

23. A method of making a sealing system comprising the steps of:
   a) providing a first part made of a ceramic matrix composite material;
   b) providing a seal made of a metal alloy in sliding contact with said ceramic matrix composite material;
   c) forming a single longitudinal groove in a surface of the seal in sliding contact with said ceramic matrix composite material;
   d) disposing a quantity of an erosion-resistant material harder than said ceramic matrix composite material throughout a length of the groove; and e) disposing a quantity of a friction reducing material on said seal to completely overlie said erosion-resistant material and in sliding contact with said cylinder of the ceramic matrix composite material.

24. The method of claim 23 wherein:

said step of disposing a quantity of an erosion-resistant material harder than ceramic matrix composite material throughout the length of the groove comprises plasma spraying tungsten carbide cobalt into the length of the groove.

25. The method of claim 23 wherein:

a) said step of forming a longitudinal groove in a surface of the seal in sliding contact with the ceramic matrix composite material comprises forming a groove of between 5 and 25 mils in depth; and, b) said step of disposing a quantity of an erosion-resistant material harder than ceramic matrix composite material throughout the length of the groove comprises plasma spraying tungsten carbide cobalt into the length of the groove so that said tungsten carbide cobalt spans along said length of said groove with a substantially uniform thickness.

26. The method of claim 23 wherein:

said step of forming a longitudinal groove in a surface of the seal in sliding contact with the ceramic matrix composite material includes leaving said ears of seal material extending above an outer surface of the erosion-resistant material.

* * * * *